US012692346B2

(12) United States Patent
Klun et al.

(10) Patent No.: US 12,692,346 B2
(45) **Date of Patent: *Jul. 28, 2026**

(54) POLYMERIZABLE COMPOSITIONS AND COMPOUNDS COMPRISING PERFLUORINATED GROUP, HYDROLYSABLE SILANE GROUP, AND (METH)ACRYL GROUP

(71) Applicant: 3M INNOVATIVE PROPERTIES COMPANY, St. Paul, MN (US)

(72) Inventors: Thomas P. Klun, Lakeland, MN (US); Brandon R. Pietz, St. Paul, MN (US); Paul J. Homnick, Lake Elmo, MN (US); Christopher S. Lyons, St. Paul, MN (US); Chad M. Amb, Roberts, WI (US); Jonathan M. Ryss, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 952 days.

This patent is subject to a terminal disclaimer.

(21) Appl. No.: 17/912,947

(22) PCT Filed: Apr. 26, 2021

(86) PCT No.: PCT/US2021/029063

§ 371 (c)(1),
(2) Date: Sep. 20, 2022

(87) PCT Pub. No.: WO2021/231068

PCT Pub. Date: Nov. 18, 2021

(65) Prior Publication Data

US 2023/0151149 A1 May 18, 2023

Related U.S. Application Data

(60) Provisional application No. 63/024,633, filed on May 14, 2020.

(51) Int. Cl.

| | |
|---|---|
| ***C08F 214/18*** | (2006.01) |
| ***C08F 230/08*** | (2006.01) |
| ***C08G 65/00*** | (2006.01) |
| ***C08J 5/18*** | (2006.01) |

(52) U.S. Cl.

CPC .......... *C08G 65/007* (2013.01); *C08F 214/18* (2013.01); *C08F 230/085* (2020.02); *C08J 5/18* (2013.01); *C08J 2371/02* (2013.01)

(58) Field of Classification Search

None

See application file for complete search history.

(56) References Cited

U.S. PATENT DOCUMENTS

| | | | |
|---|---|---|---|
| 3,250,808 A | 5/1966 | Moore, Jr. et al. | |
| 5,461,173 A | 10/1995 | Sato et al. | |
| 7,335,786 B1 | 2/2008 | Iyer et al. | |
| 7,718,264 B2 | 5/2010 | Klun et al. | |
| 7,745,653 B2 | 6/2010 | Iyer et al. | |
| 7,825,272 B2 | 11/2010 | Iyer et al. | |
| 7,897,678 B2 | 3/2011 | Qiu | |
| 8,658,248 B2 | 2/2014 | Anderson et al. | |
| 8,729,211 B2 | 5/2014 | Klun et al. | |
| 8,748,060 B2 | 6/2014 | Qiu | |
| 9,718,896 B2 | 8/2017 | Hari et al. | |
| 9,718,961 B2 | 8/2017 | Corveleyn et al. | |
| 12,305,063 B2 * | 5/2025 | Homnick | C09D 7/63 |
| 2008/0220264 A1 | 9/2008 | Iyer et al. | |
| 2009/0025727 A1 | 1/2009 | Klun et al. | |
| 2010/0105828 A1 | 4/2010 | Iyer et al. | |
| 2010/0129672 A1 | 5/2010 | Hao et al. | |
| 2016/0145433 A1 | 5/2016 | Corveleyn et al. | |
| 2018/0138433 A1 | 5/2018 | Klun et al. | |

FOREIGN PATENT DOCUMENTS

| | | |
|---|---|---|
| CN | 101754991 A | 6/2010 |
| KR | 20100121283 A | 11/2010 |
| KR | 20100121284 A | 11/2010 |
| WO | 2017172390 A1 | 10/2017 |
| WO | 2020095258 A1 | 5/2020 |
| WO | 2020097319 A1 | 5/2020 |
| WO | 2021229331 A1 | 11/2021 |
| WO | 2021229338 A1 | 11/2021 |
| WO | 2021229340 A1 | 11/2021 |
| WO | 2021229348 A1 | 11/2021 |
| WO | 2021229547 A1 | 11/2021 |
| WO | 2022123498 A1 | 6/2022 |

OTHER PUBLICATIONS

International Search Report for PCT Application No. PCTUS202129063, mailed on Aug. 9, 2021, 4 pages.

* cited by examiner

*Primary Examiner* — Richard A. Huhn
(74) *Attorney, Agent, or Firm* — Carolyn A. Fischer

(57) ABSTRACT

A polymerizable composition is described comprising a fluorinated monomer, oligomer, or mixture thereof; and a coupling agent comprising a (meth)acryl terminal group, a terminal silane comprising hydrolysable groups and a perfluorooxyalkylene or perfluorooxyalkyl moiety. Also described are compounds and methods.

16 Claims, No Drawings

POLYMERIZABLE COMPOSITIONS AND COMPOUNDS COMPRISING PERFLUORINATED GROUP, HYDROLYSABLE SILANE GROUP, AND (METH)ACRYL GROUP

SUMMARY

Although various coupling agents have been described, industry would find advantage in coupling agents that can improve adhesion of fluorinated free-radically polymerizable materials.

In one embodiment, a polymerizable composition is described comprising a fluorinated monomer, oligomer, or mixture thereof, and a coupling agent comprising a (meth) acryl terminal group, a terminal silane comprising hydrolysable groups and a perfluorooxyalkylene or perfluorooxyalkyl moiety.

Also described are compounds comprising a perfluorooxyalkylene or perfluorooxyalkyl group, a hydrolysable silane group, and a (meth)acryl group. The compounds may be described by Formula 1 and 2, as subsequently described.

In another embodiment, a mixture of compounds is described comprising the reaction product of i) a compound comprising a perfluorooxyalkylene moiety and two (meth) acryl groups; and ii) a silane compound comprising hydrolysable groups and a group selected from amine or mercapto group. Compounds i) and ii) are reacted at a molar ratio such that there is an excessive number of (meth)acryl groups with respect to the number of active hydrogens of the amine or mercapto groups.

In another embodiment, a method of making a cured composition is described comprising providing a polymerizable composition comprising a fluorinated coupling agent as described herein; and curing the polymerizable composition.

DETAILED DESCRIPTION

Presently described are compounds comprising a perfluorinated group, a hydrolysable silane group, and a (meth) acryl group.

In one embodiment, the compound has the following formula (Formula 1):

$$H_2C{=}C(R^{21})C(O)X^{22}L^{21}R_f^{2}L^{22}X^{22}C(O)CH_2CH_2R^{22}R^{25}Si(Y)_p(R^{26})_{3-p}$$

wherein $R^{21}$ is H or $CH_3$;

$X^{22}$ is —O—, —S—, or —$NR^{23}$—, wherein $R^{23}$ is H or an alkyl group of 1 to 4 carbon atoms;

$L^{21}$ and $L^{22}$ are organic linking groups;

$R_f^2$ is a divalent perfluorooxyalkylene;

$R^{22}$ is —S— or —$N(R^{24})$—, wherein $R^{24}$ is $C_1$-$C_4$ alkyl or $R^{25}Si(Y_p)_p(R^{26})_{3-p}$;

$R^{25}$ is a divalent alkylene group optionally comprising one or more catenary oxygen atoms;

Y is a hydrolysable group;

$R^{26}$ is a non-hydrolysable group; and p is 1, 2, or 3.

As used herein the term "catenary" refers to substituting a carbon atom of a carbon chain with a substituent (e.g. 0 or N). Thus, a pendent substituent (e.g. —OH) bonded to a carbon atom is not a catenary oxygen atom.

Y is typically a $C_1$-$C_4$ alkoxy group and most typically a $C_1$ or $C_2$ alkoxy group.

When present (i.e. p is 1 or 2), $R^{26}$ is typically $C_1$-$C_6$ alkyl, an aromatic group such as phenyl, or hydrogen.

In some embodiments, $L^{21}$, $L^{22}$, $R^{25}$ are alkylene comprising 1 to 12 carbon atoms and any interval of integers within such range such as 1 to 6 or 1 to 4 carbon atoms.

In some embodiments, $L^{21}$, and $L^{22}$ are organic linking groups that include —$C(O)NHR^{25}$.

In some embodiments, the divalent perfluoroxyalkylene group comprises moieties of 2 to 6 (e.g. linear or branched) perfluorinated carbon atoms and a single oxygen atom, such as —$CF_2$—$CF_2$—O—, —$CF(CF_3)$—$CF_2$—O—, —$CF_2$—$CF(CF_3)$—O—, —$CF_2$—$CF_2$—$CF_2$—O—, —$CF(CF_3)$—O—, and —$CF_2$—$CF_2$—$CF_2$—$CF_2$—O. In some embodiments, the number of perfluorinated carbon atoms is at least 2 or 3. In some embodiments, the number of perfluorinated carbon atoms is no greater than 5 or 4.

In typical embodiments, the divalent perfluorooxyalkyl group comprises perfluorinated poly(oxyalkylene) groups, having the general structure —$[C_mF_{2m}O]_s$— wherein for each s, m independently ranges from 1 to 6. In some embodiments, m is at least 2 or 3. In some embodiments, the m is no greater than 5 or 4. In some embodiments, s is at least 3, 4, 5, 6, 7, 8, 9, or 10. In some embodiments, s is no greater than 24, 23, 22, 21, 20, 19, 18, 17, 16, 15, 14, 13, 12, 11, or 10.

$R_f^2$ is a divalent perfluorooxyalkyl group. In some embodiments, $R_f^2$ is -HFPO- referring to the group —$(CF_3)CF$—$[OCF_2(CF_3)CF]_s$—$O(CF_2)_pO$—$[CF(CF_3)CF_2O]_t$—$CF(CF_3)$—, wherein p ranges from 2 to 6 and s and t are independently integers of 2 to 25. In some embodiments p is 3 or 4. In some embodiments, the sum of s and t is at least 3, 4, 5, 6, 7, 8, 9, or 10. In some embodiments, the sum of s and t is no greater than 24, 23, 22, 21, 20, 19, 18, 17, 16, 15, 14, 13, 12, 11, or 10. Divalent -HFPO- generally also exists as a distribution or mixture of molecules with a range of values for s and t. Thus, s and t may be expressed as an average value. Such average value is typically not an integer.

Some representative compounds of Formula 1 include

R = $CH_3$

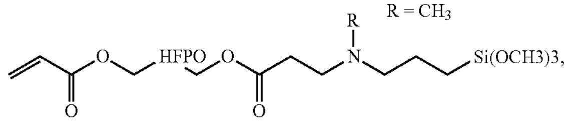

or

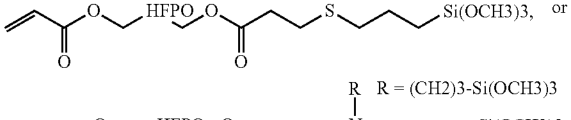

R = $(CH2)3$-$Si(OCH3)3$

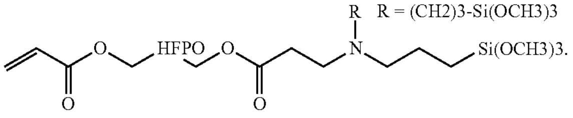

In another embodiment, the compound has the following formula (Formula 2):

$$\begin{array}{l} R_f^{1}\text{-}L^{23}\text{-}R^{25}\text{-}(NR^{25})_{m2}Si(Y)_p(R^{26})_{3-p} \\ \quad\; | \\ \quad L^{24}(X^{22}C(O)C(R^{21})=CH_2)_{n2} \end{array}$$

wherein $R_f^1$ is a monovalent perfluorooxyalkyl;

$L^{23}$ and $L^{24}$ are organic linking groups;

$R^{25}$ is a divalent alkylene group said alkylene groups optionally containing one or more catenary oxygen atoms;

Y is a hydrolysable group;

$R^{26}$ is a non-hydrolysable group;

p is 1, 2, or 3;

$X^{22}$ is —O—, —S—, or —$NR^{23}$—, wherein $R^{23}$ is H or an alkyl group of 1 to 4 carbon atoms;

$R^2$ is H or $CH_3$;

m2 is 1 or 2; and n2 is 1, 2, or 3.

In some embodiments, the monovalent perfluorooxyalkyl group comprises moieties of 1 to 6 (e.g. linear or branched) perfluorinated carbon atoms and a single oxygen atoms, such as $CF_3CF_2CF_2O$—. In some embodiments, the number of perfluorinated carbon atoms is at least 2 or 3. In some embodiments, the number of perfluorinated carbon atoms is no greater than 5 or 4.

In typical embodiments, the monovalent perfluorooxyalkyl group comprises perfluorinated poly(oxyalkylene) groups having repeat units of divalent perfluoroxyalkylene groups, having the general structure —$[C_mF_{2m}O]_s$, wherein for each s, m independently ranges from 1 to 6. In some embodiments, m is at least 2 or 3. In some embodiments, the m is no greater than 5 or 4. $R_f^1$ is a monovalent perfluorooxyalkyl group. In some embodiments, $R_f^1$ is HFPO- referring to the end group $CF_3CF_2CF_2O$—$[CF(CF_3)CF_2O]_s$—$CF(CF_3)$— wherein s is an integer of 2 to 25. In some embodiments, s is at least 3, 4, 5, 6, 7, 8, 9, or 10. In some embodiments, s is no greater than 24, 23, 22, 21, 20, 19, 18, 17, 16, 15, 14, 13, 12, 11, or 10. HFPO- generally exist as a distribution or mixture of molecules with a range of values for s. Thus, s may be expressed as an average value. Such average value is typically not an integer.

Some representative compounds include

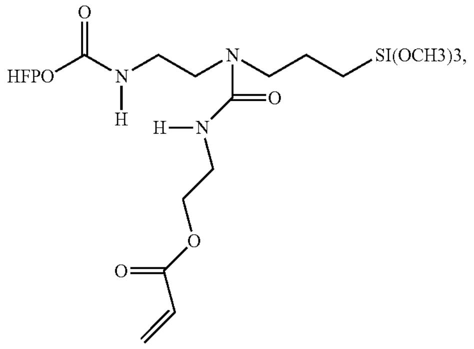

-continued

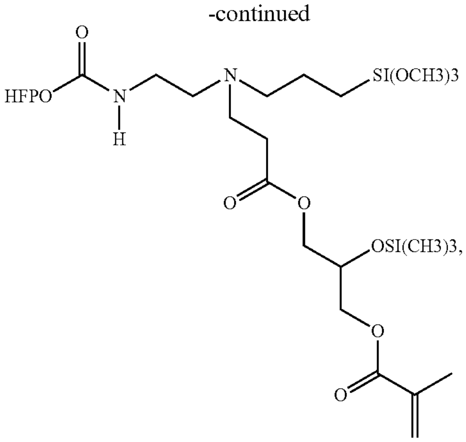

and

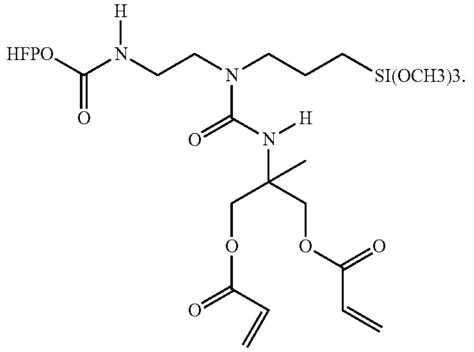

In another embodiment, the compound has the following formula (Formula 3).

$$R_f^1L^{23}[X^{22}C(O)CH_2CH_2R^{22}Si(Y)_p(R^{26})_{3-p}]_{n2}$$
$$|$$
$$(X^{22}C(O)C(R^{21})=CH_2)_{n2}$$

wherein $R_f^3$ is a monovalent perfluorooxyalkyl;

$L^{23}$ is an organic linking groups, wherein $L^{23}$ is optionally organic linking group that includes —C(O)$NHR^{25}$;

$X^{22}$ is —O—, —S—, or —$NR^{23}$—, wherein $R^{23}$ is H or an alkyl group of 1 to 4 carbon atoms;

$R^{22}$ is —S— or —$N(R^{24})$—, wherein $R^{24}$ is $C_1$-$C_4$ alkyl or $R^{25}Si(Y_p)_p(R^{26})_{3-p}$ $R^{25}$ is a divalent alkylene group said alkylene groups optionally containing one or more catenary oxygen atoms;

Y is a hydrolysable group;

$R^{26}$ is a non-hydrolysable group;

$R^{21}$ is H or $CH_3$;

p is 1, 2, or 3; and n2 is 1, 2, or 3.

Representative compounds include:

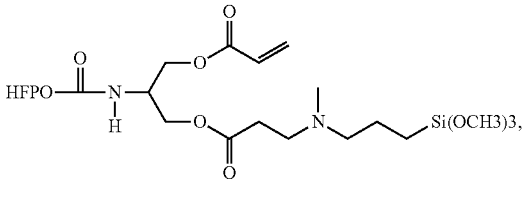

and

-continued

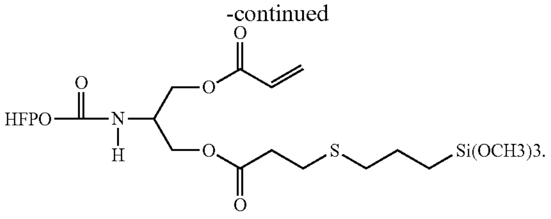

The compounds described herein can be prepared by any suitable method.

In one embodiments, the compounds (of Formula 1) comprise the (e.g. Michael addition) reaction product of i) a (meth)acryl functional perfluorinated compound; and ii) a silane compound comprising amine or mercapto group and hydrolysable groups. As used herein, "(meth)acryl" means (meth)acrylate, thio(meth)acrylate or (meth)acrylamide. In some embodiments, acryl is preferred i.e. acrylate, thioacrylate, and acrylamide.

The i) (meth)acryl functional perfluorinated compound and ii) silane compound comprising an amine or mercapto group and hydrolysable groups are combined in a suitable solvent. When a homogeneous mixture or solution is obtained a catalyst is optionally added, and the reaction mixture is heated at a temperature, and for a time sufficient for the reaction to occur. Progress of the reaction can be determined by monitoring the olefin concentration by use of $^1$H Fourier Transform Nuclear Magnetic Resonance (FT-NMR).

In some embodiments, a fluorinated solvent is utilized. Various partially fluorinated or perfluorinated solvents are known including perfluorocarbons (PFCs), hydrochlorofluorocarbons (HCFCs), perfluoropolyethers (PFPEs), and hydrofluorocarbons (HFCs), as well as fluorinated ketones and fluorinated alkyl amines. Such solvents are commercially available, for example, under the trade designation NOVEC from 3M Company, St. Paul, MN.

In other embodiments, the solvent is non-fluorinated, such as in the case of ketones such as acetone, methyl ethyl ketone (MEK), methyl isobutyl ketone, methyl amyl ketone and N-methyl pyrrolidone (NMP); ethers such as tetrahydrofuran, 2-methyl tetrahydrofuran and methyl tetrahydrofurfuryl ether; esters such as methyl acetate, ethyl acetate and butyl acetate; cyclic esters such as delta-valerolactone and gamma-valerolactone.

Perfluorooxyalkyl and perfluoroxyalkylene compounds can be obtained by oligomerization of hexafluoropropylene oxide that result in terminal carbonyl fluoride group(s). This carbonyl fluoride(s) may be converted to an ester by reactions known to those skilled in the art. Preparation of perfluorinated methyl ester compounds are described, for example, in U.S. Pat. Nos. 3,250,808 and 9,718,896. Preparation of perfluorooxyalkyl and perfluoroxyalkylene comprising (meth)acryl groups is also known. See for example, U.S. Pat. No. 9,718,896.

Acids, bases, and fluoride sources are catalysts for oligomerization of silane coupling agents through the silane functionality. Thus washing or otherwise treating the compound comprising a perfluorooxyalkylene moiety and two (meth)acryl groups to remove these impurities before reacting with silane compound comprising hydrolysable groups and a group selected from amine or mercapto group, will lessen the tendency of the resulting silane product to oligomenze.

In one embodiment, the preparation of a compound according to Formula 1 comprises Michael addition of i) a compound comprising a perfluorooxyalkylene moiety and two (meth)acryl groups; and ii) a silane compound comprising hydrolysable groups and a group selected from amine or mercapto group; wherein i) and ii) respectively are reacted at a molar ratio such that there is an excessive number of (meth)acryl groups with respect to the number of active hydrogens of the amine or mercapto groups. Mercapto groups always have one active hydrogen. However, amines can have one or two active hydrogens. For example primary amines contain two active hydrogens and can Micheal add to potentially two acrylate) groups. Secondary amines have only one active hydrogen and can Michael add to only one (meth)acrylate group. In some embodiments, the molar ratio of i) to ii) is at least 1.1:1, 1.2:1, 1.3:1, 1.4:1, 1.5:1, 1.6:1, 1.7:1, 1.8:1, 1.9:1, or 2:1. In some embodiments, the molar ratio of i) to ii) ranges from 2:1 to 99:1. In some embodiments, the molar ratio of i) to ii) is at least 3:1, 4:1, 5:1, 6:1, 7:1, 8:1, or 9:1.

Thus, the reaction product comprises a mixture of compounds. The mixture comprises a compound comprising a terminal (meth)acryl group bonded to a perfluorooxyalkylene moiety, wherein the perfluorooxyalkylene moiety is bonded via an amine linkage to a terminal silane comprising hydrolysable groups (e.g. as depicted by Formula 1). The amount of such compound in the reaction mixture is typically at least 1%, 2%, 3%, 4%, 5%, 6%, 7%, 8%, 9%, 10%, or 11% by mole fraction. The mixture of compounds further comprises (e.g. 89%-99% unreacted compound i) compound comprising a perfluorooxyalkylene moiety and two di(meth) acryl groups. The mixture of compounds may further comprise compounds where both of the acryl groups of i) are bonded via an amine linkage to a terminal alkoxy silane compound. However, the presence of such compound is typically less than the amount of compound having a (meth) acryl group (e.g. as depicted by Formula 1.

In some embodiments, the coupling agent is synthesized from one of the same (e.g. HFPO di(meth)acyl) perfluorinated monomer or oligomer as the (e.g. photo)polymerizable composition.

The silane compounds generally have the formula $R^{22}R^{25}Si(Y)_p(R^{26})_{3-p}$ as defined above in Formulas 1 and 2. In typical embodiments, Y is a $C_1$-$C_4$ alkoxy group and most typically a $C_1$-$C_2$ alkoxy group. $R^{26}$ is typically $C_1$-$C_6$ alkyl, an aromatic group such as phenyl, or hydrogen.

Examples of silane compounds comprising hydrolysable groups and an amine group include 3-aminopropyltrimethoxysilane (SILQUEST A-1110), 3-aminopropyltriethoxysilane (SILQUEST A-1100), N-methyl-3-aminopropyltrimethoxysilane, N-butyl-3-aminopropyltrimethoxysilane (DYNASYLAN 1189), bis(3-trimethoxysilylpropyl)amine, bis(3-triethoxysilylpropy) amine, bis(3-trimethoxysilylpropyl)n-methylamine, 3-(2-aminoethyl)aminopropyltrimethoxysilane (SILQUEST A-1120), SILQUEST A-1130, (aminoethylaminomethyl)-phenethyltrimethoxysilane, (aminoethylaminomethyl)-phenethyltriethoxysilane, N-(2-aminoethyl)-3-aminopropylmethyldimethoxysilane (SILQUEST A-2120), bis-(.gamma.-triethoxysilylpropyl)amine (SILQUEST A-1170), N-(2-aminoethyl)-3-aminopropyltributoxysilane, 6-(aminohexylaminopropyl)trimethoxysilane, 4-aminobutyltrimethoxysilane, 4-aminobutyltriethoxysilane, p-(2-aminoethyl)phenyltrimethoxysilane, 3-aminopropyltris (methoxyethoxyethoxy)silane, 3-aminopropylmethyldiethoxy-silane, 3-(N-methylamino) propyltrimethoxysilane, N-(2-aminoethyl)-3-aminopropylmethyldimethoxysilane, N-(2-aminoethyl)-3-aminopropylmethyldiethoxysilane, N-(2-aminoethyl)-3- aminopropyltrimethoxysilane, N-(2-aminoethyl)-3-aminopropyltriethoxysilane, 3-aminopropylmethyldiethoxysilane, 3-aminopropylmethyldimethoxysilane, 3-aminopropyldimethylmethoxysilane, and 3-aminopropyldimethylethoxysilane.

Examples of silane compounds comprising hydrolysable groups and a mercapto group include for example 3-mercaptopropyltriethoxysilane; 3-mercaptopropyl-trimethoxysilane; 11-mercaptoundecyltrimethoxysilane; s-(octanoyl) mercapto-propyltriethoxysilane; (mercaptomethyl) methyldiethoxysilane; and 3-mercaptopropylmethyldimethoxysilane Various other silane compounds comprising hydrolysable groups and an amine or mercapto group are described in the literature.

In another embodiment, the preparation of a compound according to Formula 2 comprises reacting a monovalent perfluorooxyalkyl methyl ester compound with a silane compound comprising a polyamine (e.g. diamine) group and hydrolysable groups. One representative compound is $H_2NCH_2CH_2NHCH_2CH_2CH_2(Si(OCH_3)_3$. The terminal primary amine group reacts with the ester group forming an amide linkage. The other (e.g. secondary) amine group can be reacted with a compound comprising an amine-reactive group and a (meth)acryl group. In one embodiment, the amine-reactive group is an isocyanate such as in the case of isocyanatoethyl acrylate. Other examples of suitable isocyanate functional (meth)acrylate include isocyanatoethyl methacrylate, isocyanatoethoxyethyl methacrylate, and 1,1-(bisacryloyloxymethyl) ethyl isocyanate, which are for instance commercially available from Showa Denko (Tokyo, Japan). This results in forming an amide linkage, e.g. $L^{24}$ of Formula 2 is —C(O)NHR$^{27}$—, wherein $R^{27}$ is $C_1$-$C_4$ alkylene. In another embodiment, the amine-reactive group is a (meth)acryl group of a di(meth)acryl compound such as 1-(acryloyloxy)-3-(methacryloyloxy)-2-propanol or hexane diol diacrylate or a multi(meth)acryl compound such as trimethyolpropane triacrylate or pentaerythritol triacrylate. This results in forming an ester linkage, e.g. $L^{24}$ of Formula 2 is $—(CH_2)_nC(O)X^{22}R^{27}—$, wherein n typically ranges from 2 to 6. In yet another embodiment, the amine-reactive group is a (meth)acryl group of a di(meth)acryl compound comprising a pendent alcohol protected group, such as depicted as follows:

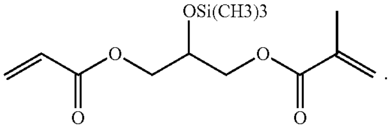

In this embodiment, $L^{24}$ of Formula 2 is $—CH_2CH_2C(O)X^{22}CH_2CH(OR^{28})R^{27}—$; wherein $R^{28}$ is an alcohol protecting group such as a silyl (e.g. trimethylsilyl) group. Other alcohol protecting groups are known in the literature. See for example Protective Groups in Organic Chemistry (ISBN 978-1-4684-7218-9) by J McOmic in the chapter by C B. Reese, Protection of Alcoholic Hydroxyl Groups and Glycol Systems, pages 95-143, and in Greene's Protective Groups In Organic Synthesis (ISBN 0-471-68754-0). Fourth Edition, by Peter G. M. Wuts and Theodora W. Greene, Chapter 2.

Since the perfluorinated methyl ester reactant comprises a mixture of perfluoroxyalkylene groups of various chain lengths, the resulting fluorinated coupling agent also comprises a mixture of perfluoroxyalkylene groups of various chain lengths. The coupling agent compound (e.g. according to Formulas 1 and 2) typically has a (e.g. number average) molecular weight of no greater than 3000, 2500, 2000, 1500, 1000, or 500 g/mole. In some embodiments, the (e.g. number average) molecular weight is at least 500, 1000, or 1500 g/mole. During the synthesis of the compound, the molecular weight can be calculated by the equivalent weight of the reactants. Alternatively, the molecular weight of the coupling agent can be determined by nuclear magnetic resonance (NMR), liquid chromatography optionally followed by NMR, and/or mass spectrometry.

In some embodiments, the coupling agent (e.g. according to Formulas 1 and 2) has an average wt. % fluorine of at least 30, 35, 40, 45, 46, 47, 48, 49, 50, 51, 52, 53, 54, 55, or 60 wt. %. During the synthesis of the compound, the wt. % fluorine can be calculated from the reactants. Alternatively, the wt. % fluorine can be calculated utilizing Combustion Ion Chromatography (CIC) as described in WO2017/172390. In some embodiments, the coupling agent has an average wt. % fluorine of no greater than 70, 65, 60, 55, 50, or 40 wt. %.

Coupling agents with a sufficiently high fluorine content are miscible with highly fluorinated free-radically polymerizable monomers, oligomers, polymers.

In another embodiment, a (e.g. photo)polymerizable composition is described comprising at least one free-radically polymerizable (e.g. acryl) monomer, oligomer, polymer, or combination thereof, and the fluorinated coupling agent, as described herein.

Such coupling agents are particularly advantageous for use is in a polymerizable composition comprising fluorinated free-radically polymerizable monomer(s), oligomer(s), or combinations thereof. In some embodiments, the fluorinated free-radically polymerizable monomer(s), oligomer(s), or combinations thereof have a fluorine content of at least 25, 30, 35, 40, 45, 50, 55, 60, or 65 wt. % and typically less than 75 wt. %.

In typical embodiments, the (e.g. photo)polymerizable composition comprises one or more fluorinated coupling agent in an amount of at least 1, 2, 3, 4, 5, 6, 7, 8, 9, or 10 wt. % solids. The amount of fluorinated coupling agent is typically no greater than 50 wt. % solids of the total polymerizable composition. In some embodiments, the amount of fluorinated coupling agent is at least 15, 20, 25, 30, 35, or 40 wt. % solids of the total polymerizable composition. The fluorinated coupling agent may be a single compound as described herein, a combination of compounds as described herein, or at least one fluorinated coupling agent as described herein in combination with a different fluorinated coupling agent, such as described in the literature.

In one embodiment, the fluorinated coupling agent, as described herein, is utilized during the (e.g. photo)polymerization of a fluorinated oligomer comprising a perfluorinated (e.g. perfluorooxyalkyl or perfluorooxyalkylene) group. Suitable fluorinated acrylate monomers and oligomers include mono- and di-(meth)acrylates with molecular weights from about 200-3000 g/mole, including mono- and di-acrylates of perfluoropolyether oligomers, such as described in U.S. Pat. No. 8,658,248.

In one embodiment, the (e.g. photo)polymerizable composition comprises an HFPO oligomer diacrylate such as depicted as follows, where n is selected such that the molecular weight (Mn) is at least 1000, 1500, or 2000 g/mole.

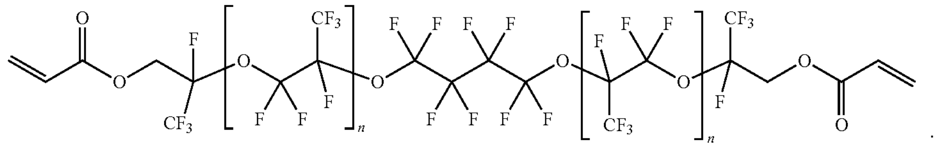

The fluorinated coupling agent, as described herein can improve the adhesion of the cured HFPO oligomer diacrylate.

Also described is a method of making a cured composition comprising providing a (e.g. photo)polymerizable composition comprising the fluorinated coupling agent as described herein; and curing the polymerizable composition. The (meth)acryl groups are subject to free-radical curing by exposure to ultraviolet radiation (UV), electron beam (e-beam), ionizing radiation (gamma rays), plasma radiation as well as thermal polymerization. In some embodiments, the method further comprises coating the polymerizable composition onto a substrate prior to curing. In some embodiments, upon radiation curing the polymerizable composition forms a film or film layer.

In some embodiments, radiation curing comprises exposing the (e.g. coated) composition to wavelengths of ultraviolet (UV) and visible light.

UV light sources can be of various types. Low light intensity sources, such as blacklights, generally provide intensities ranging from 0.1 or 0.5 $mW/cm^2$ (millwatts per square centimeter) to 10 $mW/cm^2$ (as measured in accordance with procedures approved by the United States National Institute of Standards and Technology as, for example, with a UVIMAP UM 365 L-S radiometer manufactured by Electronic Instrumentation & Technology, Inc., in Sterling, VA). High light intensity sources generally provide intensities greater than 10, 15, or 20 $mW/cm^2$ ranging up to 450 $mW/cm^2$ or greater. In some embodiments, high intensity light sources provide intensities up to 500, 600, 700, 800, 900 or 1000 $mW/cm^2$. UV light can be provided by various light sources such as light emitting diodes (LEDs), fluorescent blacklights, arc-lamps such as xenon-arc lamps and medium and low-pressure mercury lamps (including germicidal lamps), microwave-driven lamps, lasers, etc., or a combination thereof. The composition can also be polymerized with higher intensity light sources as available from Fusion UV Systems Inc. Lamps that emit ultraviolet or blue light are typically preferred. The UV exposure time for polymerization and curing can vary depending on the intensity of the light source(s) used. For example, curing with a low intensity light source can be accomplished with an exposure time ranging from about 30 to 300 seconds; whereas curing with a high intensity light source can be accomplished with shorter exposure time ranging from about 1 to 20 seconds.

When the (e.g. photo)polymerizable composition comprises cured fluorinated free-radically polymerizable monomer(s), oligomer(s), and combinations thereof, the cured composition can have a low refractive index.

Low refractive index layers may be deposited by a process of vapor coating fluorinated acrylate monomers and/or oligomers, optionally with adhesion promoter(s) and/or photoinitiator(s); and curing by exposure to ultraviolet radiation (UV), electron beam (e-beam), ionizing radiation (gamma rays) or plasma radiation. The photoinitiator may be fluorinated or non-fluorinated (e.g. Darocur 1173). Fluorinated photoinitiators are described in the literature described in U.S. Provisional Nos. 63/024572 and 63/025134, both incorporated herein by reference. The process and articles are described in PCT Publication Nos. WO 2020/095258; WO 2020/097319; and concurrently filed U.S. Provisional Nos. 63/025068 and 63/025178; incorporated herein by reference.

The following examples are provided to further illustrate the presently described invention.

TABLE 1

Materials

| Material designation | Description |
| --- | --- |
| 4 Angstrom sieves | CAS Number 109-87-5, obtained from Sigma Aldrich, St. Louis, MO. |
| Acryloyl Chloride | CAS number 814-68-6, obtained from Sigma Aldrich. |
| aminoethanol | 2-aminoethanol, CAS number 141-43-5, obtained from Sigma Aldrich. |
| N-(2-aminoethyl)-3-aminopropyltrimethoxysilane $H_2NCH_2CH_2NHCH_2CH_2CH_2$—$(Si(OCH_3)_3$ (AEAPTMS) | CAS number 1760-24-3, obtained as Silquest™ A-1120 from Momentive Performance Materials, Waterford, NY. |
| N—Me—APTMS | N-methyl-3-aminopropyltrimethoxysilane, CAS number 3069-25-8, obtained from Oakwood Chemical, Estill, SC. |
| BEI | 1,1-Bis(acryloyloxymethyl)ethyl isocyanate, CAS number 886577-76-0, available under the trade designation "KARENZ BEI," from Showa Denko America, New York, New York. |
| BHT | Butylated hydroxytoluene, CAS number 128-37-0, obtained from Sigma Aldrich. |
| Bis-(propyltrimethoxysilyl) amine (B-PTMS) | CAS number 82985-35-1, obtained as Silquest™ A-1170 from Momentive Performance Materials. |
| DBTDL | Dibutyltin Dilaurate, CAS number 77-58-7, obtained from TCI America, Portland, OR. |

TABLE 1-continued

| Materials | |
|---|---|
| Material designation | Description |
| Dichloromethane | $CH_2Cl_2$, obtained from EMD Millipore, a part of Merck KGaA, Billerica, MA. |
| G-AC-MAC Glycerol acrylate methacrylate | 1-(acryloyloxy)-3-(methacryloyloxy)-2-propanol, CAS 1709-71-3), obtained from TCI America. |
| HFPO Oligomer Diacrylate Mn = 2000 g/mol | 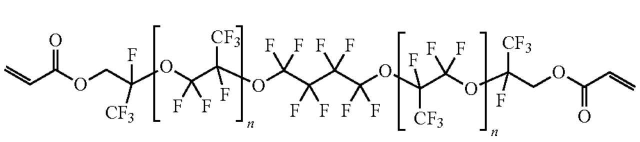 Prepared according to the synthetic method generally described in U.S. Pat. No. 9,718,961. (PFE-3) |
| HFPO dihydro diol-alpha, omega | Prepared by a method similar to that shown in U.S. Pat. No. 9,718,896 Column 16, lines 32-55. |
| HFPO di(methyl ester) alpha, omega | $CH_3O(O)C—(CF_3)CF—[OCF_2(CF_3)CF]_s—O(CF_2)_uO—[CF(CF_3)CF_2O]_t—CF(CF_3)—C(O)OCH_3$, Prepared by a method similar to that shown in U.S. Pat. No. 9,718,896 Column 16, lines 36-46. |
| HFPO methyl ester | $C_3F_7O[CF(CF_3)CF_2O]_nCF(CF_3)—C(O)OCH_3$ is prepared by a method similar that in U.S. Pat. No. 3,250,808, followed by fractional distillation. |
| IEA | Isocyanatoethyl acrylate, MW 144.12, CAS number 13641-96-8, available under the trade designation "KARENZ AOI," from Showa Denko. |
| di-isopropylethylamine (Hunig's Base) | CAS 7087-68-5, obtained from Alfa Aesar, Haverhill, MA. |
| Magnesium sulfate, anhydrous | CAS number 7487-88-9,obtained from Sigma-Aldrich. |
| (3-mercaptopropyl) trimethoxysilane (MPTMS) | CAS number 4420-74-0, obtained from Alfa Aesar. |
| MTBE | Methyl-t-butyl ether, CAS number 1634-04-4, from EMD Millipore, a part of Merck KGaA, Billerica, MA |
| Novec 7200 | $C_4F_9OCH_2CH_3$, obtained from 3M Company, St Paul, MN. |
| Serinol | $H_2N—CH(CH_2OH)_2$, CAS number 534-03-2, obtained from Sigma-Aldrich. |
| TEMPO | 2,2,6,6-Tetramethyl-1-piperidinyloxy, free radical, CAS number 2564-83-2, obtained from Sigma-Aldrich. |
| TFT | 1,1,1-trifluorotoluene, CAS number 98-08-8, obtained from Sigma, Aldrich. |
| THF | Tetrahydrofuran, from EMD Millipore. |
| TMS chloride | Trimethylsilyl chloride, CAS 75-77-4, obtained from Sigma Aldrich, St. Louis, MO. |
| TEA | Triethylamine, obtained from Sigma Aldrich. |
| XK-672 | Zn based catalyst obtained as "K-KAT XK-672" from King Industries, Norwalk, CT. |

Preparation of Example 1-1

Preparation of Michael Adduct of 1 mole of N-methyl-amino(propyltrimethoxysilane) with 9 moles of HFPO Oligomer Diacrylate

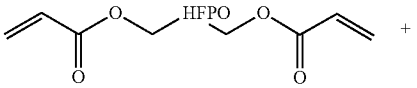

9

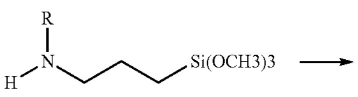

1

-continued

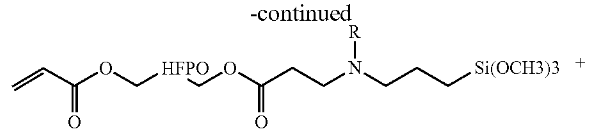

R = CH3

1

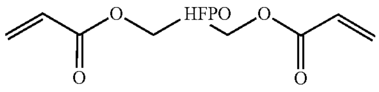

8

To a 500 mL roundbottom flask equipped with stirbar and septum under nitrogen was added 120 g (0.0663 mol, 1810 MW) of HFPO Oligomer Diacrylate and 120 g of 1,1,1-trifluorotoluene which was previously dried as a 50% solids solution over 4 Angstrom molecular sieves in a septum capped bottle. Next, 1.42 g (1.46 ml, 0.007366 mol, 193.32 number average MW) N-methyl-3-aminopropyltrimethoxysilane was added and the reaction was stirred at room temperature (RT) for 2 h, at which time an aliquot was evaluated by $^1$H Fourier transform nuclear magnetic resonance spectroscopy (FT-NMR) in D8-tetrahydrofuran/Freon 113. The reaction was then concentrated on a rotary evaporator at 2 torr at 57° C. for about 30 min and bottled under nitrogen.

Examples 1-2 to 1-8, Example 2 and Example 3 and 3-1 Reactions were run in a manner similar to that for Preparation 1, except that reactions run in Novec 7200 were concentrated at about 35° C. at aspirator pressure for about 15 min, then at about 2 torr for 30 min. For Examples 1-2 to 1-6 different amounts of the same reactants were used as detailed in the following table. For Examples 2 and 3 different silane compounds were used as detailed in the following table. The structures for Examples 2 and 3 are as follows:

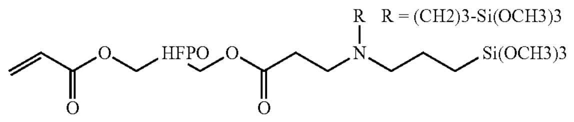

Example 2

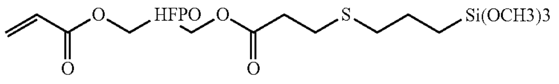

Example 3

| Example number | HFPO diacrylate g | HFPO diacrylate mol | Silane | Silane g | Silane mol | Solvent | Solvent g | Approximate Molar Ratio HFPO diacrylate to Silane |
|---|---|---|---|---|---|---|---|---|
| Ex. 2 | 30.00 | 0.01657 | B-APTMS | 0.629 | 0.001842 | 7200 | 30 | 9 to 1 |
| Ex. 1-2 | 30.00 | 0.01657 | N-Me-APTMS | 0.356 | 0.001842 | 7200 | 30 | 9 to 1 |
| Ex. 1-3 | 22.93 | 0.01266 | N-Me-APTMS | 0.272 | 0.00141 | 7200 | 22.93 | 9 to 1 |
| Ex. 1-4 | 56.00 | 0.03094 | N-Me-APTMS | 0.665 | 0.003438 | 7200 | 56.00 | 9 to 1 |
| Ex. 1-5 | 40.00 | 0.0221 | N-Me-APTMS | 0.475 | 0.00246 | 7200 | 40.00 | 9 to 1 |
| Ex. 1-6 | 27.36 | 0.01511 | N-Me-APTMS | 0.731 | 0.003779 | TFT | 27.36 | 4 to 1 |
| Ex. 1-7 | 26.68 | 0.01474 | N-Me-APTMS | 1.068 | 0.005527 | TFT | 26.68 | 2.66 to 1 |
| Ex. 1-8 | 23.32 | 0.01454 | N-Me-APTMS | 1.406 | 0.00727 | TFT | 26.32 | 2 to 1 |
| Ex. 3* | 30.00 | 0.01657 | MPTMS | 0.362 | 0.001842 | 7200 | 30.00 | 9 to 1 |
| Ex. 3-1** | 33.18 | 0.01833 | MPTMS | 0.800 | 0.00407 | TFT | 33.18 | 9 to 2 |

*During the preparation of Example 3, 0.044 grams (solids) of Hunig's base was added as 0.44 g of a 10% solids solution of Hunig's base in 7200.

**During the preparation of Example 3-1, 0.0263 grams (solids) of Hunig's base was added as 0.263 g of a 10% solids solution of Hunig's base in TFT.

Preparation of HFPO—C(O)NH—$CH_2CH_2NH$—$CH_2CH_2CH_2$—$Si(OCH_3)_3$ Intermediate To a 500 mL flask equipped with a stir bar was charged HFPO methyl ester 150.00 g, (0.119237 mol, $M_n$ 1258) and AEAPTMS 26.51 g (0.119237, number average MW 222.36), and the reaction mixture was stirred over 2.5 days at room temperature. An aliquot was analyzed by Fourier transform infrared spectroscopy (FTIR), which showed disappearance of the ester doublet at about 1800 and 1780 $cm^{-1}$ (small, large) and appearance of an amide band at about 1718 $cm^{-1}$. The reaction was concentrated at about 3 torr for 40 min at 55° C. to provide 312.26 g of a clear liquid oil.

Preparation of Example 4

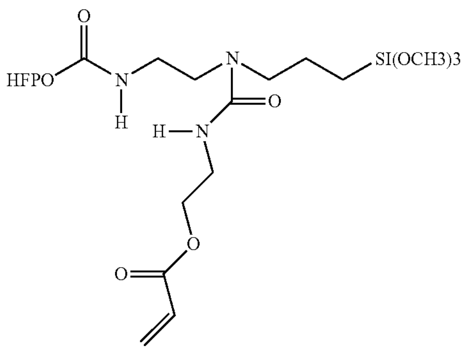

To a 100 mL flask equipped with a stir bar was charged IEA 1.95 g (0.013799 mol), and the flask was placed in an ice bath under dry air. Next, HFPO—C(O)NH—$CH_2CH_2NH$—$CH_2CH_2CH_2$—$Si(OCH_3)_3$ 20.00 g (0.133916 mol, 1449.36 $M_n$) was added via a pressure equalizing funnel. At about 27 min, 36.3 g of THF was added to the pot. At this point about one-third of the silane was added. At about 1.5 h all the silane was added to the flask and the funnel was rinsed with a few grams of THF into the reaction. Analysis by FTIR of an aliquot showed no —NCO peak at 2265 $cm^{-1}$. The material was concentrated on a rotary evaporator at up to 70° C. and about 3 torr to provide 21.59 g of a clear liquid.

Preparation of Silane Diacrylate Intermediate

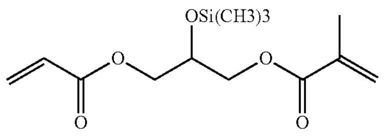

A liter roundbottom equipped with overhead stirrer was charged with G-AC-MAC 100.00 g (0.46681 mol), TEA 49.60 g (0.049015 mol), and 302 g of dichloromethane, and placed in an ice bath under dry air. Via a pressure equalizing funnel, TMS chloride was added over about 45 min, and was allowed to stir overnight, warming to room temperature. Next, 400 g of water was added to the reaction and stirred. A small aliquot was washed, dried over anhydrous magnesium sulfate, filtered, concentrated and analyzed by $^1$H FTNMR, showing the reaction to be complete. This aliquot was diluted with dichloromethane and added to the rest of the reaction, the layer separated, dried over anhydrous magnesium sulfate, and concentrated on a rotary evaporator to provide a clear oil.

Preparation of Example 5

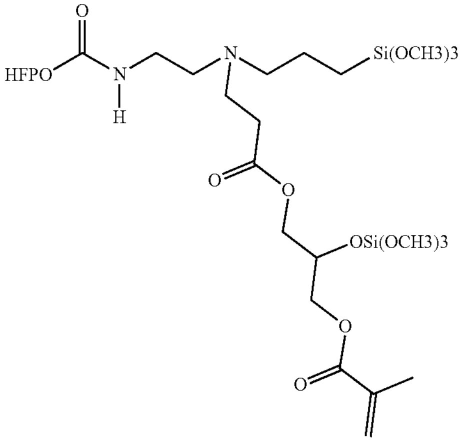

A small vial with stir bar was charged with HFPO—C(O)NH—$CH_2CH_2NH$—$CH_2CH_2CH_2$—$Si(OCH_3)_3$ 21.8 g (0.015041 mol, 1449.36 $M_n$), and 3.95 g (0.013793 mol, 286.37 MW) of the silane diacrylate intermediate just described and stirred for 24 h in a 60° C. water bath, after which time an aliquot was analyzed by $^1$H FTNMR, and its spectra was found to be consistent with the desired structure.

The fluorine content and M. of the coupling agents was as follows:

| Coupling Agent | Wt. % F | Number Average Molecular Weight |
|---|---|---|
| Example 1 | 58.74 | 2151.6 |
| Example 2 | 63.08 | 2003.3 |
| Example 3 | 62.99 | 2006.3 |
| Example 4 | 39.49 | 1590.5 |
| Example 5 | 36.19 | 1735.7 |

Preparation of Example 6

HFPO—C(O)NH—$CH_2CH_2NH$—$CH_2CH_2CH_2$—$Si(OCH_3)_3$ was reprepared in a fashion similar to the preparation of HFPO—C(O)NH—$CH_2CH_2NH$—$CH_2CH_2CH_2$—$Si(OCH_3)_3$ intermediate, using HFPO methyl ester 100.00 g, [0.0840 mol, $M_n$ 1190 (nominally $M_n$ 1321)] and AEAPTMS 18.69 g (0.0840 mol, number average MW 222.36).

Next 22.44 g (0.01864 mol, $M_n$ 1203.9) HFPO—C(O)NH—$CH_2CH_2NH$—$CH_2CH_2CH_2$—$Si(OCH_3)_3$ was dissolved in about 30 ml of TFT in a pressure equalizing addition funnel. Then 4.46 g (0.01864 mol, Mw 239.22) was dissolved in TFT to provide a volume equal to that of the HFPO—C(O)NH—$CH_2CH_2NH$—$CH_2CH_2CH_2$—$Si(OCH_3)_3$ dissolved in TFT. About 22 g of TFT was charged into a 250 mL three necked roundbottom equipped with overhead stirrer, and the pressure equalizing funnels with the HFPO—C(O)NH—$CH_2CH_2NH$—$CH_2CH_2CH_2$—$Si(OCH_3)_3$ and BEI were placed in the other two necks under dry air. The flask was placed in a methanol-water-dry ice bath maintained at −10 to −20 C. The HFPO—C(O)NH—$CH_2CH_2NH$—$CH_2CH_2CH_2$—$Si(OCH_3)_3$ and BEI TFT solutions were added over about 2 h at an equal volume (and thus equimolar) rates. The cooling bath was removed and allowed to warm up to 20 C. Using overhead stirring, the material was stripped at up to 55 C (in a 75 C bath) at a vacuum as low as 2.4 torr over 40 min. Proton NMR analysis indicated that about 11% by mole of the BEI was remaining. FTIR analysis also showed an —NCO peak at about 2265 $cm^{-1}$.

Next 23.09 g of the resultant product was added into a 250 mL three necked roundbottom equipped with overhead stirrer under dry air. To an pressure equalizing addition funnel was added 2.55 g of HFPO—C(O)NH—$CH_2CH_2NH$—$CH_2CH_2CH_2$—$Si(OCH_3)_3$ and about 9 g of TFT. The flask was placed in a methanol-water-dry ice bath maintained at −10 to −20 C, and the solution of HFPO—C(O)NH—$CH_2CH_2NH$—$CH_2CH_2CH_2$—$Si(OCH_3)_3$ in TFT was added over about 9 min, after which time it was removed from the cooling bath. NMR and FTIR analyses showed respectively much less or no —NCO left. The reaction was stripped as before, providing the product. The structure for Preparative Example 8 is as follows:

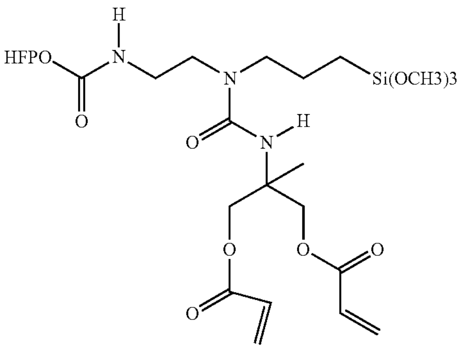

Preparation of Example 7

A 500 mL single necked roundbottom flask equipped with stirbar was charged with 100 g (0.0757 eq, $M_n$ 1321) HFPO methyl ester (HFPO—C(O)$CH_3$) and 9.95 g serinol (0.109209 mol, 91.11 MW), and heated in an oil bath at 40 C for 45 min with stirring, and then at 75 C for 3.25 h more. FTIR analysis showed a strong peak at 1790 $cm^{-1}$ corresponding to the methyl ester, and some amide peak corresponding to the desired product at 1714 $cm^{-1}$. The flask was placed on a rotary evaporator at 75 C at 22 torr for 34 min. A sample taken for FTIR analysis showed the equal intensity of peaks at 1790 $cm^{-1}$ and 1714 $cm^{-1}$. The reaction was monitored by FTIR at 1.5 h and 2.25 h at 22 torr and monitoring by FTIR was continued for each step. Next the pressure was reduced to 4 torr for 1.25 h (3.5 h total) on the rotary evaporator. Next 1 g of serinol was added and stripping on the rotary evaporator continued for an additional 2.25 h-still a small peak remained at 1790 $cm^{-1}$. Then 1.36 g more serinol was added and stripping continued for 2.75 h more at 4 torr, and at the end of that time no methyl eater peak remained. The material was dissolved in 200 g of MTBE, successively washed with 20 g of 2N HCl in a separatory funnel, 20 g of 10% sodium bicarbonate, and finally with 20 g water and 10 g of a brine solution, allowing the lower aqueous phase to separate from the upper organic phase in each case. The organic phase was dried over anhydrous magnesium sulfate, filtered, washing the filtrate with additional MTBE. The material was stripped under aspirator pressure on a rotary evaporator for 2.5 h. This intermediate, which was characterized by $^1$H FT-NMR has the structure: HFPO—C(O)NH—CH—$(CH_2OH)_2$.

A 250 mL flask equipped with overhead stirrer was charged with 40.0 g (0.0576 eq, 694.06 EW) HFPO—C(O)NH—CH—$(CH_2OH)_2$, 8.16 g (0.0807 mol, 101.19 EW) triethylamine, and 80 g MTBE and placed under a dry air atmosphere. The reaction was heated to 38 C, and 6.78 g (0.07492 eq, 90.51 MW) acryloyol chloride was added via a pressure equalizing addition funnel over about 30 min. After reacting for about 22 h. the reaction had lost much of its solvent, and MTBE was added to bring the reaction to its initial weight of all charges. The reaction was stirred with 26.6 g of 1N HCl, and allowed to separate into layers in a separatory funnel. The phase split was poor, so 21 g of MTBE was added, the contents shaken for 1 min, and the upper organic phase drained back into the flask. It was stirred for 10 min with 100 g of 10% sodium carbonate, allowed to separate in the separatory funnel, and the upper organic phase was drained back into the flask. It was stirred for 10 min with 33.3 g brine and 73.8 g water and the upper organic phase was dried over anhydrous magnesium sulfate, and filtered, the filtrate being washed with additional MTBE. The solution was treated with 0.016 g BHT and 0.004 g TEMPO, concentrated on a rotary evaporator at 45 C at 22 tor for 30 min, foaming a fair amount, and then concentrated for 30 min at 0.85 torr at 63 C to yield 36.27 g.

Of product that was characterized by $^1$H FT-NMR. This intermediate which was characterized by $^1$H FT-NMR has the structure:

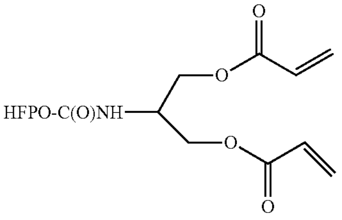

APTMS, a 9:2 ratio of the HFPO adduct to the aminosilane. The reaction was stirred for 2 h at room temperature, then concentrated at 35 C for 20 min on a rotary evaporator at 0.75 torr. The structure which was characterized by $^1$H FT-NMR for Preparative Example 8 is as follows:

2 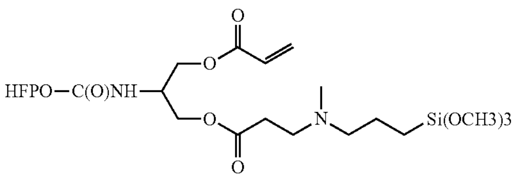 +

7 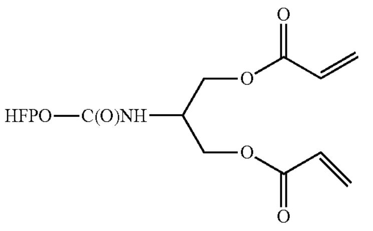

Preparation of Example 8

A 100 mL single necked roundbottom flask equipped with stirbar was charged with 39.23 g (0.060216 eq, EW 651.49) HFPO di(methyl ester) alpha, omega and 3.68 g 2-aminoethanol (0.602 mol, 61.08 EW), and stirred for 45 min at room temperature. FTIR analysis showed a small peak at 1790 $cm^{-1}$ corresponding to the methyl ester, and a larger amide peak corresponding to the desired product at 1710 $cm^{-1}$. The flask was placed in an oil bath heated to 75 C for 1.5 h and FTIR analysis showed no methyl ester peak, only the product amide peak. The reaction was placed on a rotary evaporator and stripped at 65 C for 1 h 45 min under a vacuum of 0.7 torr. The structure for this intermediate which was characterized by $^1$H FT-NMR is as follows:

$HOCH_2CH_2NH—(O)C—(CF_3)CF—[OCF_2(CF_3)CF]_s—O(CF_2)_4O—[CF(CF_3)CF_2O]_t—CF(CF_3)—C(O)NHCH_2CH_2OH$ or $HOCH_2CH_2NH—(O)C\text{-HFPO-}C(O)NHCH_2CH_2OH$ The 36.27 g of product was diluted to 40% solids with 54.41 g THF, then stored over 4 Angstrom sieves.

Next 88.57 g of the 40% solution (33.43 g solids, 0.02205 mol, $M_n$ 1516) was charged through a 0.45 micron PTFE syringe filter into a 250 mL roundbottom flask equipped with stirbar along with 0.947 g (0.0490 mol, 193.32 MW)

A 250 mL flask equipped with overhead stirrer was charged with 30.0 g (0.044086 eq, 680.49 EW) $HOCH_2CH_2NH$—(O)C—HFPO—$C(O)NHCH_2CH_2OH$, 6.25 g (0.06172 mol, 101.19 EW) triethylamine, and 60 g MTBE and placed under a dry air atmosphere. The reaction was heated to 38 C, and 4.99 g (0.0551 eq, 90.51 MW)

acryloyol chloride was added via a pressure equalizing addition funnel over about 20 min. After reacting for about 22 h, the reaction had lost some of its solvent, and MTBE was added to bring the reaction to its initial weight of all charges. The reaction was stirred for 10 min with 18 g of 1N HCl and 36 g water, but there was no split apparent. To obtain a split, the reaction was successively shaken in the separatory funnel with treated with 10 g of brine, 23 g of MTBE, 10 g of brine, and 10 g of brine which produced a split over 1.5 h. The bottom aqueous layer weighed 48.3 g and the top organic layer weighed 151.05 g. A 1 g aliquot of the top organic layer was placed in a vial, and shaken with 0.75 g of 10% aqueous sodium carbonate, producing a good phase split. This was added to the top organic layer, which was then stirred for 10 min with 100 g of 10% aqueous sodium carbonate, and allowed to phase split in a separatory funnel overnight. The bottom aqueous layer was 139.83 g and the top organic phase was 109.43 g. The top organic phase was stirred with 54 g of brine for 11 min and separated into a bottom aqueous layer of 55.37 and a top organic layer of 96.69 g. The organic layer was dried over anhydrous magnesium sulfate, filtered through a C porosity fritted Buchner funnel with additional MTBE. About 2.5 mg TEMPO and 10 mg BHT was added, and the material was concentrated on a rotary evaporator at 44 C at 250 to 50 torr of vacuum to remove most of the solvent, then at 63 C at 0.85 torr for 30 min, yielding 31.22 g of a slightly cloudy yellow-brown oil. The material was diluted to 40% solids in THF, and dried over 4 Angstrom sieves. The structure for this intermediate which was characterized by $^1$H FT-NMR is as follows:

$H_2C{=}CHC(O)OCH_2CH_2NH{-}(O)C\text{-}HFPO\text{-}C(O)NHCH_2CH_2OC(O)CH{=}CH_2$.

Next 72.76 g of the 40% solids THF solution (29.10 g solids, 0.0198 mol, $M_n$ 1469)

$H_2C{=}CHC(O)OCH_2CH_2NH{-}(O)C\text{-}HFPO\text{-}C(O)NHCH_2CH_2OC(O)CH{=}CH_2$ was charged through a 0.45 micron PTFE syringe filter into a 250 mL roundbottom flask equipped with stirbar along with 0.85 g (0.0044 mol, 193.32 MW) APTMS, a 9:2 ratio of the HFPO adduct to the aminosilane. The reaction was stirred for 2 h at room temperature, then concentrated at 35 C for 20 min on a rotary evaporator at 0.75 torr. The structure which was characterized by $^1$H FT-NMR for Preparative Example 10 is as follows:

$7\ H_2C{=}CHC(O)OCH_2CH_2NH{-}(O)C\text{-}HFPO\text{-}C(O)NHCH_2CH_2OC(O)CH{=}CH_2$ $2\ H_2C{=}CHC(O)OCH_2CH_2NH{-}(O)C\text{-}HFPOC(O)NHCH_2CH_2OC(O)CH_2CH_2N(CH3)CH_2CH_2CH_2Si(OCH_3)_3$ Preparation of Example 9

A weight of 50.28 g of 40% solids TFT solution dried over 4 Angstrom sieves (20.11 g solids, 0.01369 mol, $M_n$ 1469)

$H_2C{=}CHC(O)OCH_2CH_2NH{-}(O)C{-}HFPO{-}C(O)NHCH_2CH_2OC(O)CH{=}CH_2$ was charged through a 0.45 micron PTFE syringe filter into a 250 mL roundbottom flask equipped with stirbar along with 0.60 g (0.003042 mol, 193.32 MW) MPTMS, a 9:2 ratio of the HFPO adduct to the thiosilane, and 0.98 g (0.098 g solids, 0.000761 mol) of a 10% solids solution of Hunig's base in TFT. The reaction was stirred for 24 h at room temperature, then concentrated at 35 C for 30 min on a rotary evaporator at 0.85 torr. The structure which was characterized by $^1$H FT-NMR for Preparative Example 11 is as follows:

$7\ H_2C{=}CHC(O)OCH_2CH_2NH{-}(O)C\text{-}HFPO\text{-}C(O)NHCH_2CH_2OC(O)CH{=}CH_2$ $2\ H_2C{=}CHC(O)OCH_2CH_2NH{-}(O)C\text{-}HFPOC(O)NHCH_2CH_2OC(O)CH_2CH_2SCH_2CH_2CH_2Si(OCH_3)_3$ The fluorinated coupling agents of Examples 1-9 was combined with HFPO Oligomer Diacrylate and photoinitiator. The composition was coated onto a substrate and cured by exposure to radiation. The fluorinated coupling agents were found to improve adhesion to the substrate. Further details are described in U.S. Provisional Patent Application No. 63/025,178, incorporated herein by reference.

What is claimed is:

1. A compound comprising a perfluorooxyalkylene moiety bonded to a silane compound comprising hydrolysable groups with an amine moiety; wherein the amine moiety further comprises a pendent group having a terminal (meth) acryl group.

2. The compound of claim 1 having the following formula:

$$R_f^1\text{-}L^{23}\text{-}R^{25}\text{-}(NR^{25})_{m2}Si(Y)_p(R^{26})_{3-p}$$
$$|$$
$$L^{24}(X^{22}C(O)C(R^{21}){=}CH_2)_{n2}$$

wherein $R_f^1$ is a monovalent perfluorooxyalkyl;

$L^{23}$ and $L^{24}$ are organic linking groups;

$R^{25}$ is a divalent alkylene group said alkylene groups optionally containing one or more catenary oxygen atoms;

Y is a hydrolysable group;

$R^{26}$ is a non-hydrolysable group;

p is 1, 2, or 3;

$X^{22}$ is —O—, —S—, or —$NR^{23}$—, wherein $R^{23}$ is H or an alkyl group of 1 to 4 carbon atoms;

$R^{21}$ is H or $CH_3$;

m2 is 1 or 2; and n2 is 1, 2, or 3.

3. The compound of claim 1 having the following formula:

$$R_f^1\text{-}L^{23}[X^{22}C(O)CH_2CH_2R^{22}R^{25}Si(Y)_p(R^{26})_{3-p}]_{n2}$$
$$|$$
$$(X^{22}C(O)C(R^{21}){=}CH_2)_{n2}$$

wherein $R_f^1$ is a monovalent perfluorooxyalkyl;

$L^{23}$ is an organic linking groups, wherein $L^{23}$ is optionally organic linking group that includes —$C(O)NHR^{25}$;

$X^{22}$ is —O—, —S—, or —$NR^{23}$—, wherein $R^{23}$ is H or an alkyl group of 1 to 4 carbon atoms;

$R^{22}$ is —S— or —$N(R^{24})$—, wherein $R^{24}$ is $C_1$-$C_4$ alkyl or $R^{25}Si(Y_p)_p(R^{26})_{3-p}$ $R^{25}$ is a divalent alkylene group said alkylene groups optionally containing one or more catenary oxygen atoms;

Y is a hydrolysable group;

$R^{26}$ is a non-hydrolysable group;

$R^{21}$ is H or $CH_3$;

p is 1, 2, or 3; and n2 is 1, 2, or 3.

4. A compound having the following formula:

$$H_2C{=}C(R^{21})C(O)X^{22}L^{21}R_f^2L^{22}X^{22}C(O)CH_2CH_2R^{22}R^{25}Si(Y)_p(R^{26})_{3-p}$$

wherein $R^{21}$ is H or $CH_3$;

$X^{22}$ is —O—, —S—, or —$NR^{23}$— wherein $R^{23}$ is H or an alkyl group of 1 to 4 carbon atoms, $L^{21}$ and $L^{22}$ are organic linking groups;

$R_f^2$ is a divalent perfluorooxyalkylene;

$R^{22}$ is —S— or —$N(R^{24})$— wherein $R^{24}$ is $C_1$-$C_4$ alkyl or —$R^{25}Si(Y)_3$;

$R^{25}$ is a divalent alkylene group optionally comprising one or more catenary oxygen atoms;

Y is a hydrolysable group;

$R^{26}$ is a non-hydrolysable group; and p is 1, 2, or 3.

5. A mixture of compounds comprising the reaction product of i) a compound comprising a perfluorooxyalkylene moiety and two (meth)acryl groups; and ii) a silane compound comprising hydrolysable groups and a group selected from amine or mercapto group;

wherein i) and ii) are reacted at a molar ratio of excess compound i) such that (meth)acryl groups remain unreacted.

6. The mixture of compounds of claim 5 wherein the molar ratio ranges from 2:1 to 10:1.

7. The mixture of compounds of claim 5 wherein the mixture comprises a compound having the following formula:

$$H_2C{=}C(R^{21})C(O)X^{22}L^{21}R_f^2L^{22}X^{22}C(O)CH_2CH_2R^{22}R^{25}Si(Y)_p(R^{26})_{3-p}$$

wherein $R^{21}$ is H or $CH_3$;

$X^{22}$ is —O—, —S—, or —$NR^{23}$— wherein $R^{23}$ is H or an alkyl group of 1 to 4 carbon atoms, $L^{21}$ and $L^{22}$ are organic linking groups;

$R_f^2$ is a divalent perfluorooxyalkylene;

$R^{22}$ is —S— or —$N(R^{24})$— wherein $R^{24}$ is $C_1$-$C_4$ alkyl or —$R^{25}Si(Y)_3$;

$R^{25}$ is a divalent alkylene group optionally comprising one or more catenary oxygen atoms;

Y is a hydrolysable group;

$R^{26}$ is a non-hydrolysable group; and p is 1, 2, or 3.

8. The mixture of compounds of claim 5 wherein the mixture of compounds further comprises unreacted compound i).

9. The mixture of compounds of claim 5 wherein the mixture of compounds further comprises a compound wherein both (meth)acryl groups are reacted with compound ii).

10. A polymerizable composition comprising a fluorinated monomer, oligomer, or mixture thereof, and a coupling agent comprising a (meth)acryl terminal group, a terminal silane comprising hydrolysable groups and a perfluorooxyalkyl or perfluorooxyalkylene moiety; wherein the coupling agent has a formula according to:

i) $H_2C{=}C(R^{21})C(O)X^{22}L^{21}R_f^2L^{22}X^{22}C(O)CH_2CH_2R^{22}R^{25}Si(Y)_p(R^{26})_{3-p}$ wherein $R^{21}$ is H or $CH_3$;

$X^{22}$ is —O—, —S—, or —$NR^{23}$— wherein $R^{23}$ is H or an alkyl group of 1 to 4 carbon atoms, $L^{21}$ and $L^{22}$ are organic linking groups;

$R_f^2$ is a divalent perfluorooxyalkylene;

$R^{22}$ is —S— or —$N(R^{24})$— wherein $R^{24}$ is $C_1$-$C_4$ alkyl or —$R^{25}Si(Y)_3$;

$R^{25}$ is a divalent alkylene group optionally comprising one or more catenary oxygen atoms;

Y is a hydrolysable group;

$R^{26}$ is a non-hydrolysable group; and p is 1, 2, or 3; or ii)

$$R_f^1\text{-}L^{23}\text{-}R^{25}\text{-}(NR^{25})_{m2}Si(Y)_p(R^{26})_{3-p}$$
$$|$$
$$L^{24}(X^{22}C(O)C(R^{21}){=}CH_2)_{n2}$$

$R_f^1$ is a monovalent perfluorooxyalkyl;

$L^{23}$ and $L^{24}$ are organic linking groups;

$R^{25}$ is a divalent alkylene group said alkylene groups optionally containing one or more catenary oxygen atoms;

Y is a hydrolysable group;

$R^{26}$ is a non-hydrolysable group;

p is 1, 2, or 3;

$X^{22}$ is —O—, —S—, or —$NR^{23}$—, wherein $R^{23}$ is H or an alkyl group of 1 to 4 carbon atoms;

$R^{21}$ is H or $CH_3$;

m2 is 1 or 2; and n2 is 1, 2, or 3; or iii)

$$R_f^1\text{-}L^{23}[X^{22}C(O)CH_2CH_2R^{22}R^{25}Si(Y)_p(R^{26})_{3-p}]_{n2}$$
$$|$$
$$(X^{22}C(O)C(R^{21})=CH_2)_{n2}$$

wherein $R_f^1$ is a monovalent perfluorooxyalkyl;

$L^{23}$ is an organic linking groups, wherein $L^{23}$ is optionally organic linking group that includes —$C(O)NHR^{25}$;

$X^{22}$ is —O—, —S—, or —$NR^{23}$—, wherein $R^{23}$ is H or an alkyl group of 1 to 4 carbon atoms;

$R^{22}$ is —S— or —$N(R^{24})$—, wherein $R^{24}$ is $C_1$-$C_4$ alkyl or $R^{25}Si(Y_p)_p(R^{26})_{3-p}$ $R^{25}$ is a divalent alkylene group said alkylene groups optionally containing one or more catenary oxygen atoms;

Y is a hydrolysable group;

$R^{26}$ is a non-hydrolysable group;

$R^{21}$ is H or $CH_3$;

p is 1, 2, or 3; and n2 is 1, 2, or 3.

11. The polymerizable composition of claim 10 wherein the fluorinated monomer, oligomer, or mixture thereof has a fluorine content of at least 25, 30 or 35 wt. %.

12. The polymerizable composition of claim 10 wherein the composition comprises a fluorinated oligomer comprising a perfluorooxyalkylene group.

13. The polymerizable composition of claim 10 wherein the coupling agent is linear or branched.

14. The polymerizable composition of claim 10 wherein the coupling agent has a number average molecular weight of no greater than 3000, 2500, 2000, 1500, 1000, or 500 g/mole.

15. The polymerizable composition of claim 10 wherein the coupling agent has a number average wt. % fluorine of at least 30, 35, 40, 50, 55, 60 or 65 wt. %.

16. The polymerizable composition of claim 10 wherein the coupling agent has formula ii) and $L^{24}$ comprises an amide, ester or thioester moiety and optionally a pendent alcohol protecting group.

* * * * *